United States Patent
Lopez-Hilfiker et al.

(10) Patent No.: US 10,811,240 B2
(45) Date of Patent: Oct. 20, 2020

(54) APPARATUS AND METHOD FOR ANALYSING A CHEMICAL COMPOSITION OF AEROSOL PARTICLES

(71) Applicant: TOFWERK AG, Thun (CH)

(72) Inventors: Felipe Lopez-Hilfiker, Bern (CH); Marc Gonin, Thun (CH); Mike Cubison, Mühledorf (CH)

(73) Assignee: TOFWERK AG, Thun (CH)

( * ) Notice: Subject to any disclaimer, the term of this patent is extended or adjusted under 35 U.S.C. 154(b) by 0 days.

(21) Appl. No.: 16/330,992

(22) PCT Filed: Sep. 7, 2017

(86) PCT No.: PCT/EP2017/072510
§ 371 (c)(1),
(2) Date: Mar. 6, 2019

(87) PCT Pub. No.: WO2018/046619
PCT Pub. Date: Mar. 15, 2018

(65) Prior Publication Data
US 2019/0237316 A1     Aug. 1, 2019

(30) Foreign Application Priority Data
Sep. 7, 2016  (WO) .................. PCT/EP2016/071120

(51) Int. Cl.
*H01J 49/00* (2006.01)
*H01J 49/04* (2006.01)
(Continued)

(52) U.S. Cl.
CPC .......... *H01J 49/0445* (2013.01); *G01N 15/02* (2013.01); *G01N 15/1031* (2013.01);
(Continued)

(58) Field of Classification Search
CPC ........ H01J 49/00; H01J 49/02; H01J 49/0404; H01J 49/0418; H01J 49/0459;
(Continued)

(56) References Cited

U.S. PATENT DOCUMENTS 5,270,542 A    12/1993  McMurry et al.
5,681,752 A    10/1997  Prather
(Continued)

FOREIGN PATENT DOCUMENTS

WO    WO 2016/004542 A1    1/2016

OTHER PUBLICATIONS

Chen et al., "Rapid In Vivo Fingerprinting of Nonvolatile Compounds in Breath by Extractive Electrospray Ionization Quadrupole Time-of-Flight Mass Spectrometry", Angew. Chem. Int. Ed., 2007, vol. 46, pp. 580-583.
(Continued)

*Primary Examiner* — Jason L McCormack
(74) *Attorney, Agent, or Firm* — Birch, Stewart, Kolasch & Birch, LLP

(57) ABSTRACT

The invention relates to an apparatus and a method for analysing a chemical composition of aerosol particles. The apparatus comprises an extractive electrospray ionisation source for extracting components, in particular organic compounds, from the aerosol particles and for ionising the components to ions, and a mass analyser, in particular a time of flight mass analyser, for analysing the ions, the mass analyser fluidly coupled to the extractive electrospray ionisation source. The method includes the steps of extracting components, in particular organic compounds, from the aerosol particles with an extractive electrospray ionisation source and ionising the components with the extractive electrospray ionisation source to ions, transferring the ions to a mass analyser, in particular a time of flight mass
(Continued)

analyser, the mass analyser being fluidly coupled to the extractive electrospray ionisation source, and analysing the ions with the mass analyser.

17 Claims, 1 Drawing Sheet

(51) Int. Cl.
*H01J 49/16* (2006.01)
*G01N 15/02* (2006.01)
*G01N 15/10* (2006.01)
*H01J 49/40* (2006.01)
*G01N 15/00* (2006.01)

(52) U.S. Cl.
CPC ........ *H01J 49/0027* (2013.01); *H01J 49/165* (2013.01); *H01J 49/40* (2013.01); *G01N 2015/0026* (2013.01); *G01N 2015/0046* (2013.01)

(58) Field of Classification Search
CPC ...... H01J 49/0463; H01J 49/16; H01J 49/161; H01J 49/162; H01J 49/164
USPC ........................................ 250/281, 282, 288
See application file for complete search history.

(56) References Cited

U.S. PATENT DOCUMENTS

| | | | |
|---|---|---|---|
| 6,040,574 A | | 3/2000 | Jayne et al. |
| 6,133,567 A | * | 10/2000 | Baumgardner ...... A61B 5/1459 250/288 |
| 8,648,294 B2 | | 2/2014 | Prather et al. |
| 2005/0230615 A1 | | 10/2005 | Furutani et al. |
| 2012/0149009 A1 | * | 6/2012 | Levis .................. H01J 49/0004 435/5 |
| 2015/0235833 A1 | | 8/2015 | Bazargan et al. |
| 2017/0315101 A1 | * | 11/2017 | Green .................... G01N 30/06 |

OTHER PUBLICATIONS

Doezema et al., Analysis of secondary organic aerosols in air using extractive electrospray ionization mass spectrometry (EESI-MS), RSC Adv., 2012, vol. 2, 2930-2938.

Gu et al., "Rapid analysis of aerosol drugs using nano extractive electrospray ionization tandem mass spectrometry", Analyst, 2010, vol. 135, pp. 1259-1267.

* cited by examiner

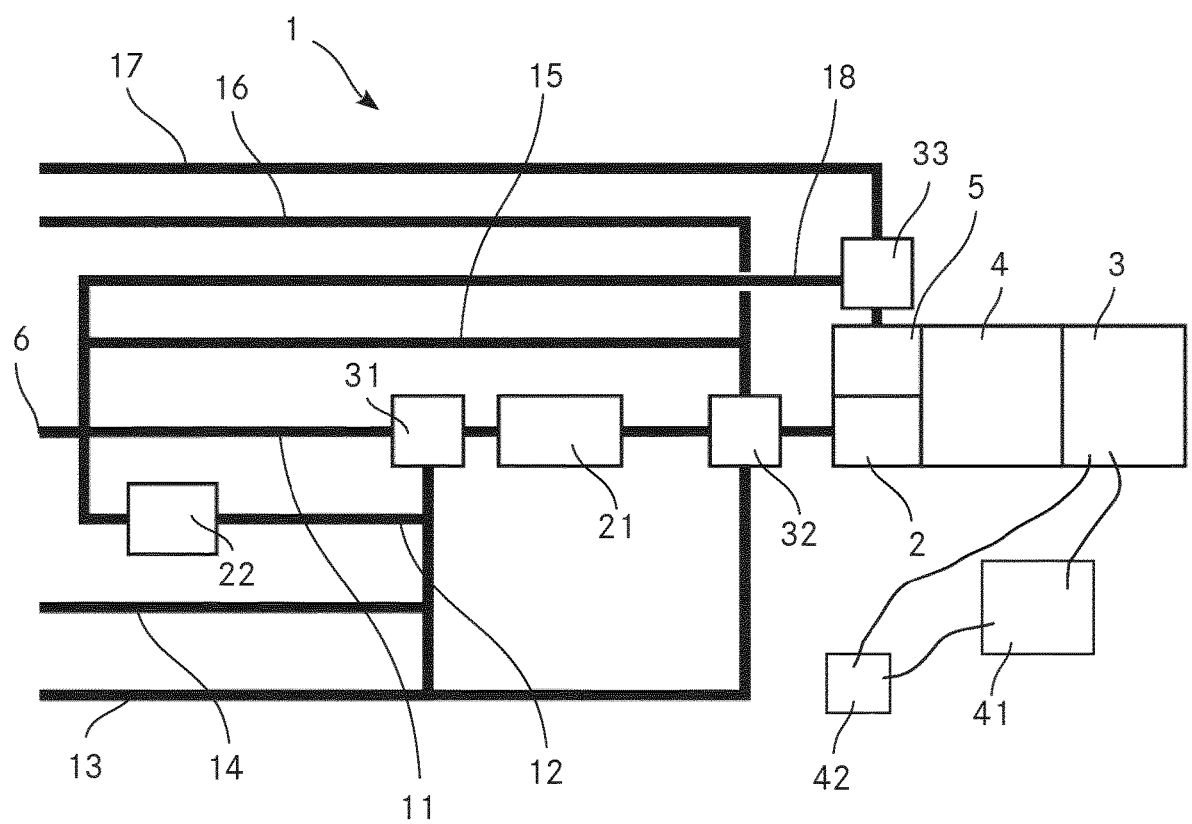

APPARATUS AND METHOD FOR ANALYSING A CHEMICAL COMPOSITION OF AEROSOL PARTICLES

TECHNICAL FIELD

The invention relates to an apparatus and a method for analysing a chemical composition of aerosol particles.

BACKGROUND ART

Aerosols are the gaseous suspension of fine solid or liquid particles which are called aerosol particles. In such suspensions, gas and aerosol particles interact with each other in the sense that gaseous substances can condense on the surface of the aerosol particle while simultaneously liquid or solid substances can evaporate from the aerosol particle surface into the gas phase. The equilibrium between the gas and the particle phase is largely driven by the individual compound's saturation vapour pressure.

Aerosol particles usually have a size in a range from 10 nm to 10 µm. Aerosol particles smaller than 10 nm have a large surface to size ratio and therefore grow quickly into larger aerosol particles. Aerosol particles larger than 10 µm on the other hand become too heavy to be suspended for a long time and will eventually fall to the ground. For this reason, the typical size range of ambient aerosol particles is from 50 nm to 2000 nm or 2 µm, respectively.

Instruments for investigating the chemical composition of aerosol particles are widely used in atmospheric sciences. However, they are also used in health sciences in order to investigate the effect of pollutants on human health. Pollutants are often emitted directly as particles or gaseous compounds that may condensate onto aerosol particles as emitted or after a chemical transformation by oxidation. The chemical analysis of aerosol particles is also an efficient way to detect traces of explosives because many explosives have low vapour pressure and therefore are hardly present in the gas phase at environmental temperatures but are rather present in the form of aerosol particles. At the same time explosives present a unique sampling problem because aerosol particles of explosives are sticky and can contaminate skin, clothes and objects of people that handle explosives.

Sampling aerosol particles has traditionally been done using filters or swabs. In this approach, the aerosol particles are collected on filters or swabs and later analysed in an off-line procedure. Over the last 30 years however, many instruments have been developed for analysing the chemical composition of aerosol particles on-line and in real-time. Most of these instruments rely on sampling air directly into a mass spectrometer and then separating the gas phase from the particle phase in several differentially pumped stages whereby the gas phase is diluted by a factor of roughly $10^{10}$ by bringing the aerosol particles from air pressure (1000 mbar) into a vacuum with a pressure of approximately $10^7$ mbar.

An example of such an apparatus and method is described in U.S. Pat. No. 6,040,574 of Jayne, Worsnop and Kolb. In this apparatus and method, an aerosol particle beam is formed by passing gas with entrained aerosol particles through a particle lens, like for example the one described in U.S. Pat. No. 5,270,542 of McMurry et al. Subsequently, the aerosol particles are flash-vaporized on a hot surface and are ionised by electron ionisation or another form of ionisation (e.g. vacuum ultra violet ionisation) and then are analysed in a time-of-flight mass analyser.

U.S. Pat. No. 5,681,752 (Kimberley), U.S. Pat. No. 8,648,294 B2 (Kimberley et al.)

Multiple versions of similar instruments use one or several lasers for vaporising the aerosol particles as well as for ionizing the vaporized substances under high vacuum, as taught in U.S. Pat. No. 5,681,752 of Kimberley or in U.S. Pat. No. 8,648,294 B2 of Kimberley et al.

All these instruments and methods have the disadvantage that they require a high vacuum and thus extensive and complex equipment.

An alternative approach for analysing the chemical composition of aerosol particles is desorbing the aerosol particles at high pressure, for example in plasma. In this approach the gas phase of the original gaseous suspension of aerosol particles must be exchanged with a clean gas in order to avoid background from gaseous contaminants. This approach is taken in a technique called single particle inductively coupled plasma mass spectrometry (SI-ICP-MS) as taught for example in US 2015/0235833 A1 of Bazargan et al. There, the aerosol particles are transferred from the original gas phase either into a liquid or into a clean gas. The latter is done with a "gas exchange device" as described by J. Anal. At. Spectrom., 2013, 28, 831-842; DOI: 10.1039/C3JA50044F or J-SCIENCE LAB, Kyoto, Japan. Because of the use of an inductively coupled plasma, this approach however does not deliver information on organic substances but only gives elemental information. Furthermore, this approach has the disadvantage that it requires extensive equipment for exchanging the gas phase of the original gaseous suspension of aerosol particles with clean gas.

For the analysis of the organic compounds of aerosol particles a technique called FIAGERO was developed where the aerosol particles are collected on a surface. After collection the surface is heated, leading to thermal desorption of the organic compounds which then are measured in a chemical ionization mass spectrometer (CI-MS), like for example described by Lopez-Hilfiker et al, in Atmos. Meas. Tech., 7, 983-1001, 2014. This technique is on-line but not exactly real-time since the collection-desorption cycle takes approximately 30 minutes.

The known apparatus' and methods for analysing a chemical composition of aerosol particles have the disadvantage that they either do not enable an on-line and real-time analysis of the chemical composition, or require an extensive equipment. Thus, they cannot be flexibly used for different types of analyses of the chemical composition of aerosol particles.

SUMMARY OF THE INVENTION

It is the object of the invention to create an apparatus and a method pertaining to the technical field initially mentioned, that allow for a flexible use for analysing the chemical composition of aerosol particles.

The solution of the invention is specified by the features of claim 1. According to the invention, the apparatus comprises an extractive electrospray ionisation source for extracting components, in particular organic compounds, from the aerosol particles and for ionising the components to ions, and a mass analyser, in particular a time-of-flight mass analyser, for analysing the ions, the mass analyser fluidly coupled to the extractive electrospray ionisation source.

The method according to the invention comprises the steps of extracting components, in particular organic compounds, from the aerosol particles with an extractive electrospray ionisation source and ionising the components with the extractive electrospray ionisation source to ions, transferring the ions to a mass analyser, in particular a time-of-flight mass analyser, the mass analyser being fluidly coupled to the extractive electrospray ionisation source, and analysing the ions with the mass analyser.

In the present text, the term extractive electronspray ionisation source is used and has the same meaning as the term extractive electrospray ionisation source. In some cases in the present text, its abbreviation EESI is used, too. In the same sense, in the present text, the term electronspray is used and has the same meaning as the term electrospray.

The solution has the advantage that with the extracting electronspray ionisation source the extraction and ionisation of the components of the aerosol particles as well as the ionisation of a sample comprising gas is enabled. Furthermore, in case the aerosol particles comprise organic compounds, the organic compounds can be extracted and ionised without damaging the organic compounds. Additionally, dissolving and ionising the aerosol particles at ambient pressure as well as at reduced pressure is enabled while at the same time an on-line and real-time analysis of the chemical composition of aerosol particles is enabled. Consequently, the apparatus and method according to the invention allow for a flexible use for analysing the chemical composition of aerosol particles.

Advantageously, the extractive electronspray ionisation source which is also referred to as extractive electrospray ionisation source comprises an electronspray, which is also referred to as electrospray, generating charged droplets of liquid for dissolving the aerosol particles. Preferably, the liquid of the charged droplets of liquid is a solvent combined with water. Alternatively, the liquid of the charged droplets of liquid may be different from a solvent combined with water. In either case, in the method according to the invention, charged droplets of liquid in which the aerosol particles are dissolved are produced by an electronspray (or electrospray) of the extractive electronspray ionisation source (or extractive electrospray ionisation source).

Preferably, the extractive electron ionisation source comprises an evaporation unit for evaporating the liquid of the charged droplets of liquid while maintaining the components of the dissolved aerosol particles. In this case, in the method according to the invention, the liquid of the charged droplets of liquid are preferably evaporated by the evaporation unit of the extractive electron ionisation source while maintaining the components of the dissolved aerosol particles such that the charge of the charged droplets is transferred to the maintained components of the dissolved aerosol particles and therefore ionising the components to ions.

Advantageously, the evaporation unit is a heating unit. Advantageously, the heating unit is a heated vaporisation region in which the charged droplets of liquid can be directed for evaporating the liquid of the charged droplets such that the components of the dissolved aerosol particles remain. In an alternative however, the heating unit may be a heating element on which the charged droplets of liquid are directed for evaporating the liquid of the charged droplets of liquid. Independent of its construction, the heating unit has the advantage that the charge from the charged droplets of liquid is transferred to the remaining components, thus ionising the components to ions.

Alternatively to the heating unit, the evaporation unit may be another unit for evaporating the liquid of the charged droplets of liquid while maintaining the components of the dissolved aerosol particles. For example such another unit may be a laser or a vaporisation region with a microwave emitter for evaporating the charged droplets of liquid such that the components of the dissolved aerosol particles remain.

Preferably, the mass analyser is configured to provide a mass spectrum of the ions when the ions are analysed. In this case, in the method according to the invention, when analysing the ions with the mass analyser, preferably a mass spectrum of the ions is produced. This has the advantage that the analysis of the ions is simplified. Alternatively, the mass analyser may not be configured to provide a mass spectrum of the ions when analysing the ions.

Advantageously, the apparatus is a single particle aerosol mass spectrometer. In this case, in the method according to the invention, the aerosol particles are preferably each analysed individually by extracting and ionising with the extractive electronspray ionisation source the components of each aerosol particle individually and subsequently transferring for each aerosol particle individually the obtained ions to the mass analyser and analysing the obtained ions with the mass analyser. Thus, the apparatus advantageously comprises a control unit for triggering the mass analyser whenever an individual aerosol particle reaches the extractive electronspray ionisation source, triggering the mass analyser for analysing the ions originating from the individual aerosol particle. For this analysis of the ions originating from one individual aerosol particle, the ions produced by the extractive electronspray ionisation source are preferable extracted into the mass analyser in a burst of ion extractions for the analysis.

Independent of whether the apparatus is a single particle aerosol mass spectrometer or not, the apparatus further preferably comprises an electronic data acquisition system for processing signals provided by the mass analyser. This electronic data acquisition system preferably comprises at least one analog-to-digital converter (ADC) producing digitized data from the signals obtained from the mass analyser and a fast processing unit receiving the digitized data from said analog-to-digital converter, wherein the fast processing unit is programmed to continuously, in real time inspect the digitized data for events of interest measured by the mass analyser, and wherein the electronic data acquisition system is programmed to forward the digitized data representing mass spectra relating to events of interest for further analysis and to reject the digitized data representing mass spectra not relating to events of interest.

This has the advantage that a high data acquisition speed can be achieved.

In particular, the digitized data is constituted by (or comprises) mass spectra, for simplicity, in the following this term is used for spectra of values of m/Q. (mass/charge). The fast processing unit may comprise in particular a digital signal processor (DSP), most preferably a Field Programmable Gate Array (FPGA).

Continuous, real-time processing means that essentially all incoming data obtained from the ADC may be readily inspected for events of interest prior to deciding about forwarding or rejecting the data, the time used for inspection of a certain portion of data being equal or less than the time used for obtaining the signals represented by the data portion by the mass analyser. In case the mass analyser is a time-of-flight mass analyser, the mass analyser may be configured to continuously acquire time-of-flight (TOF) extractions. In this case, simultaneous to the continuous acquisition of TOF extractions, the fast processing unit is preferably used for real-time analysis of the data to identify regions within the continuous stream of TOF extractions that contain events of interest. This is of particular interest for a single particle aerosol mass spectrometer where each time when an aerosol particle is ionised by the extractive electrospray ionisation source can be detected by the fast processing unit by identifying regions within the continuous stream of TOF extractions that contain events of interest in the form of a signature of an ionised aerosol particle.

We refer to those instances when a sample of interest is present as events or events of interest. We refer to the inventive method as "event triggering".

Rejection of digitized data not relating to events of interest means that this data is not forwarded to the usual further analysis. It may be completely discarded, or processed in a way that does not use a substantial capacity of the communication channel linking the electronic data acquisition system to the hardware performing the further analysis. A corresponding processing may include heavy data compression, in particular lossy compression as achieved by further processing, especially on-board at the fast processing unit.

Since the maximum continuous save rate (MCSR) of existing technologies is limited by overhead processes, the data rate for rapidly occurring events increase to a level that is too large to handle for today's data systems, whose bottle necks are given in particular by the download speed from the DAG to the PC, the processing of the data in the PC, or the writing of the data to the mass storage device. The MCSR, in turn, limits the maximum rate at which events can occur and still be individually saved with high efficiency.

Event triggering circumvents these overhead bottlenecks by transferring and saving only select TOF extractions that correspond to events of interest (EOIs). That is, TOF data are continuously acquired but not all data are transferred and saved.

Event triggering allows for maintaining efficiency at high speed by eliminating all processing times (idle time in acquisition) for data segments that do not contain information about events. By reducing dead times, reducing PC data load, and increasing the fraction of events that may be recorded at high rates, the device allows for improving TOF performance for experiments targeting both steady-state and time-varying characterization of samples.

In particular, the data acquisition with event triggering enables highly efficient data acquisition at rates faster than the MCSR for experiments measuring multiple successive samples (discontinuous), i. e. cases where the signal of interest is oscillating between ON states (sample present) and OFF states (time between sample). It basically allows for measuring the complete chemical composition of many events in rapid succession with a TOFMS. Thus it is particularly advantageous in case the apparatus is single particle aerosol mass spectrometer.

Furthermore, event triggering is particularly preferable in systems for measuring successive samples that are introduced to the mass spectrometer in a rapid and non-periodic or non-predictable manner, i. e. occurrences of successive events are not strictly periodic in time and external triggering of the TOF is not possible and/or practical. In these and other cases, averaging of data may be difficult and/or lack meaning. A highly relevant example of non-periodical, inhomogeneous events is the measurement of the chemical composition of individual small particles, for example nano particles, aerosol particles, cells or other biological entities, clusters and other entities with a dimension falling in the range of 1 nm or larger. In such cases, particles are rapidly sampled into the mass spectrometer in a sporadic succession.

Further details on the event triggering are described in WO 2016/004542 A1 of Tofwerk AG.

Preferably, the apparatus comprises an ion mobility spectrometer which is arranged between the extractive electronspray ionisation source and the mass analyser and fluidly coupled to the extractive electronspray ionisation source and the mass analyser. This has the advantage that the ions can be separated according to their mobility before transferring them to the mass analyser. Thus, the analysis of samples of aerosol particles comprising a large number of different substances is simplified. In particular, due to the ion mobility spectrometer, ions of substances having different mobilities reach the mass analyser at different times. Consequently, one mass spectrum obtained with the mass analyser comprises signals from ions of a smaller number of different substances. Therefore, the identification of the different substances in the particular mass spectrum is simplified. Yet, the different mass spectra obtained during the time interval the ions of substances having different mobilities reach the mass analyser provide the total information of the substances in the sample.

Alternatively, the apparatus may not comprise an ion mobility spectrometer.

Advantageously, the apparatus comprises an inlet for passing a gaseous suspension of the aerosol particles from an outside of the apparatus into the apparatus for analysing the chemical composition of the aerosol particles, the inlet being fluidly coupled to the extractive electronspray ionisation source. This has the advantage that a sample consisting of a gaseous suspension of the aerosol particles can be analysed. Thus, an on-line analysis of the chemical composition of aerosol particles is enabled.

In a preferred variant, the inlet is an inlet for ambient air, thus an inlet for passing ambient air comprising the aerosol particles from the outside of the apparatus into the apparatus for analysing the chemical composition of the aerosol particles. This variant has the advantage that the chemical composition of aerosol particles dispersed in the ambient air can be analysed. In this case, the aerosol particles may for example be or comprise pollutants or be or comprise explosives. In another variant however, the inlet may be an inlet for passing a different gaseous suspension of the aerosol particles than ambient air comprising the aerosol particles form the outside of the apparatus into the apparatus for analysing the chemical composition of the aerosol particles.

Alternatively, the apparatus may not comprise such an inlet. In such an alternative, the aerosol particles may be passed differently to the extractive electron ionisation source.

Preferably, the apparatus comprises a denuder line which fluidly couples the inlet to the extractive electronspray ionisation source, the denuder line comprising a denuder for separating the aerosol particles from the gas phase of the gaseous suspension when passing from the inlet to the extractive electronspray ionisation source. This has the advantage that only the aerosol particles reach the extractive electronspray ionisation source and are ionised by the extractive electronspray ionisation source such that the mass spectra obtained with the mass analyser only contain signal from ions originating from the aerosol particles. Since the gas does not reach the extractive electronspray ionisation source, the mass spectra do not contain signal from ions originating from the gas. Consequently, mass spectra obtained with the denuder in place comprise signal from ions of a smaller number of different substances. Therefore, the identification of the different substances in the mass spectra is simplified.

In an alternative, the apparatus may not comprise such a denuder line.

Advantageously, the apparatus comprises a filter line which fluidly couples the outside of the apparatus with the extractive electrospray ionisation source, the filter line comprising a filter for filtering the aerosol particles out of the gaseous suspension and thus separating the gas phase from the aerosol particles when passing from the outside of the apparatus to the extractive electrospray ionisation source. If there is a denuder switched in series with the filter, i.e. in case a denuder is switched upstream or downstream of the filter, the filter line with the filter has the advantage that a rapid determination of a background spectrum is enabled which can be subtracted from a spectrum obtained from the aerosol particles, thus reducing the detection limit. In case there is no denuder switched in series with the filter, i.e. in case there is no denuder switched upstream or downstream of the filter, the filter line with the filter has the advantage that only the gas reaches the extractive electronspray ionisation source and is ionised such that the mass spectra obtained with the mass analyser only contain signal from ions originating from the gas. Since the aerosol particles do not reach the extractive electronspray ionisation source, the mass spectra do not contain signal from ions originating from the aerosol particles. Consequently, mass spectra obtained with the filter in place comprise signal from ions of a smaller number of different substances. Therefore, the identification of the different substances in the mass spectra is simplified.

In one variant, the filter line fluidly connects the inlet with the extractive electronspray ionisation source. In another variant, the apparatus comprises a second inlet for passing the gaseous suspension of the aerosol particles into the apparatus for analysing the chemical composition of the aerosol particles, wherein the filter line fluidly connects the second inlet with the extractive electronspray ionisation source. In this case, in a preferred variant, the second inlet is an inlet for ambient air, thus an inlet for passing air comprising the aerosol particles from the outside of the apparatus into the apparatus for analysing the chemical composition of the aerosol particles. This variant has the advantage that the chemical composition of the gas phase of ambient air can be analysed. In another variant however, the second inlet may be an inlet for passing a different gaseous suspension of the aerosol particles than ambient air form the outside of the apparatus into the apparatus for analysing the chemical composition of the aerosol particles.

In case the apparatus comprises the denuder line and the filter line, the denuder line preferably enables the aerosol particles to bypass the filter, while the filter line preferably enables the gas phase of the gaseous suspension to bypass the denuder. Thus, the denuder line and the filter line are preferably switched in parallel. For example, the denuder line and the filter line may be fluidly connected by one or more switchable valves. By controlling these one or more switchable valves, the gaseous suspension of the aerosol particles may be directed via the denuder line or via the filter line from the outside of the apparatus to the extractive electronspray ionisation source. Thus, either the aerosol particles or the gas phase can be transferred from the outside of the apparatus to the extractive electronspray ionisation source for ionisation and subsequent analysis with the mass analyser. In case the gas phase is transferred to the extractive electronspray ionisation source for ionisation, the extractive electronspray ionisation source may be called a secondary electro spray ionization source.

The apparatus comprising the denuder line and the filter line, wherein the denuder line enables the aerosol particles to bypass the filter, while the filter line enables the gas phase of the gaseous suspension to bypass the denuder, has the advantage that the identification of the different substances in the mass spectra is simplified while yet, over the mass spectra obtained from the ions of the aerosol particles and the mass spectra obtained from the ions of the gas, the total information of the substances in the sample can be gathered. This advantage is particularly present in case substances in the aerosol particles and substances in the gas shall be analysed and in case the sample comprises a large number of different substances because the number of substances providing signal in one mass spectrum can be reduced as it is possible to provide either only aerosol particles or only gas to the extractive electronspray ionisation source and thus provide either only ions originating from the aerosol particles or only ions originating from the gas to the mass analyser. This reduction of the number of substances providing signal in one mass spectrum is particular advantageous in cases where a large variety of substances should be detected in the sample. This is for example the case if the apparatus is used for detecting explosives since some components of explosives are predominantly present in the gaseous phase while other are predominantly present in the form of aerosol particles or in condensed form on some other aerosol particles. Thus, when using the method according to the invention for detecting explosives in a sample comprising explosives, it is an advantageous embodiment to employ the denuder line and the filter line, wherein the denuder line enables the aerosol particles to bypass the filter, while the filter line enables the gas phase of the gaseous suspension to bypass the denuder.

In the case the sample comprises a very large number of different substances, the apparatus preferably further comprises an ion mobility spectrometer which is arranged between the extractive electronspray ionisation source and the mass analyser and fluidly coupled to the extractive electronspray ionisation source and the mass analyser. The combination of the ion mobility spectrometer with the denuder line and the filter line, wherein the denuder line enables the aerosol particles to bypass the filter, while the filter line enables the gas phase of the gaseous suspension to bypass the denuder, has the advantage that the identification of the different substances in a particular mass spectrum is further simplified while yet, over all mass spectra, the total information of the substances in the sample can be gathered. Again, this is for example the case the apparatus is used for detecting explosives. Nonetheless, an apparatus without an ion mobility spectrometer may be used for detecting explosives, too, or even an apparatus without parallel switched denuder line and filter line may be used for detecting explosives.

In a variant however, the denuder line and the filter line may be switched in series.

Alternatively, the apparatus may not comprise such a filter line.

Preferably, the apparatus comprises a clean gas line for fluidly coupling a clean gas source via the denuder with the extractive electronspray ionisation source. The clean gas is preferably a pure gas. The pure gas has preferably no hydrocarbon contamination. For example, the clean gas may be Argon or Nitrogen.

The clean gas line may comprise a switchable valve for separating the clean gas source from the denuder or fluidly coupling the clean gas source to the denuder. Independent on whether the clean gas line comprises such a switchable valve or not, the clean gas line has the advantage that clean gas can be passed through the denuder to the extractive electrospray ionisation source and thus to the mass analyser, thus enabling to check the cleanliness and integrity of the denuder.

Alternatively, the apparatus may not comprise such a clean gas line.

Advantageously, the apparatus comprises a test gas line for fluidly coupling a test gas source via the denuder with the extractive electrospray ionisation source. The test gas is preferably pure nitrogen with 10 ppm of benzene, toluene and xylene each, which is sometimes called BTX. In a variant, the test gas may however be a different gas.

The test gas line may comprise a switchable valve for separating the test gas source from the denuder or fluidly coupling the test gas source to the denuder. Independent on whether the test gas line comprises such a switchable valve or not, the test gas line has the advantage that test gas can be passed through the denuder to the extractive electrospray ionisation source and thus to the mass analyser, thus allowing to regenerate the denuder before its performance deteriorates and the apparatus produces data with high background and therefore low sensitivity.

Alternatively, the apparatus may not comprise such a test gas line.

Preferably, the apparatus comprises an air line for fluidly connecting an air source with the extractive electrospray ionisation source. This air source may be a container of air in atmospheric or higher pressure or may be air on the outside of the apparatus. In case the apparatus comprises a denuder, this air line preferably bypasses the denuder. In case the apparatus comprises a filter line, the air line preferably bypasses the filter. The air line may comprise a switchable valve for separating the air source from the extractive electrospray ionisation source or fluidly coupling the air source to the extractive electrospray ionisation source.

The air line has the advantage that running the apparatus in a mode where trace gas components are measured is enabled. Furthermore, the air line has the advantage that air can be fed directly to the extractive electron ionisation source in order to check the integrity of the gas measuring mode, i.e. the mode where the gaseous suspension of the aerosol particles is directed via the filter line from the outside of the apparatus to the extractive electrospray ionisation source.

Alternatively, the apparatus may not comprise such an air line.

Preferably, the apparatus comprises a calibration gas line for fluidly connecting a calibration gas source with the extractive electrospray ionisation source. The calibration gas is preferably nitrogen containing a known amount of the gas one plans to measure. It may however as well be pure nitrogen with accurately known amount of benzene, toluene and xylene, which is sometimes called BTX. The amounts of benzene, toluene and xylene may however differ from the amounts possible used as test gas.

In case the apparatus comprises a denuder, this calibration gas line preferably bypasses the denuder. In case the apparatus comprises a filter line, the calibration gas line preferably bypasses the filter. The calibration gas line may comprise a switchable valve for separating the calibration gas source from the extractive electrospray ionisation source or fluidly coupling the calibration gas source to the extractive electrospray ionisation source. Independent of whether the calibration gas line comprises such a switchable valve or not, the calibration gas line has the advantage that calibration gas can be passed to the extractive electrospray ionisation source and thus to the mass analyser for calibrating the apparatus for enabling quantitative measurements like for example quantitative air sample measurements.

Preferably, the apparatus comprises a second ionisation source, in particular a spark discharge ionisation source, wherein the second ionisation source is parallel connected to the extractive electrospray ionisation source. This has the advantage that with the second ionisation source, different types of ions can be generated than with the extractive electrospray ionisation source. Consequently, an elemental analysis of the chemical composition of the aerosol particles is enabled.

In case the apparatus comprises a second ionisation source, the apparatus advantageously comprises a switchable valve fluidly connected to the extractive electrospray ionisation source and the second ionisation source, wherein the switchable valve is switchable between a first position where the aerosol particles are passed to the extractive electrospray ionisation source for ionisation and a second position where the aerosol particles are passed to the second ionisation source for ionisation. Advantageously, the mass analyser is fluidly coupled to the extractive electrospray ionisation source and to the second ionisation source. This has the advantage that ions produced by the extractive electrospray ionisation source and ions produced by the second ionisation source can be analysed with the mass analyser. In a variant however, the apparatus comprises a second mass analyser which is fluidly coupled to the second ionisation source. In this variant, ions produced by the extractive electrospray ionisation source can be analysed by the mass analyser, while ions produced by the second ionisation source can be analysed by the second mass analyser.

The second ionisation source being a spark discharge ionisation source has the advantage that the aerosol particles can be atomised and ionised. Thus, the metal content of the aerosol particles can be optimally identified.

In case the second ionisation source is a spark discharge ionisation source and the apparatus comprises a denuder line, the apparatus advantageously comprises a bypass line for bypassing the denuder in the denuder line. This has the advantage that a gaseous suspension of aerosol particles can be transmitted directly to the second ionisation source for ionisation, thus enabling a better identification of the metal content of the aerosol particles.

In case the second ionisation source is a spark discharge ionisation source, the second ionisation source preferably comprises an electrode for collecting the aerosol particles and a plasma source for generating plasma from the aerosol particles. The plasma source may for example be a microwave source for generating pulsed microwaves. In an example, the pulsed microwaves may have a frequency of 2.45 GHz and a peak power of 3 kW. Further details of such a spark discharge ionisation source are disclosed in U.S. Pat. No. 9,091,597 B2 of Kulkami et al.

Alternatively, the apparatus may not comprise a second ionisation source.

In case the apparatus comprises a second ionisation source, the apparatus preferably comprises a second calibration gas line for fluidly connecting a second calibration gas source with the second ionisation source. The second calibration gas preferably comprises metal nano particles.

Alternatively, the apparatus may not comprise such a second calibration gas line.

Advantageously, the apparatus is an apparatus for determining an aerosol particle size distribution and comprises an aerosol particle gate and a drifting region, wherein the drifting region is fluidly coupled to the aerosol particle gate and the aerosol particle gate is configured to insert batches of aerosol particles or individual aerosol particles into the drifting region for passing the aerosol particles through the drifting region, wherein the mass analyser is fluidly coupled to the drifting region and configured to measure the drift time the aerosol particles require to pass through the drifting region. This has the advantage that a more profound analysis of the aerosol particles is enabled. In a preferred variant, the drifting region is arranged in the denuder line between the denuder and the extractive electronspray ionisation source.

Alternatively, the apparatus may not be an apparatus for determining an aerosol particle size distribution.

In case the apparatus is an apparatus for determining an aerosol particle size distribution, the apparatus and the method may employ a multiplexing apparatus for determining the aerosol particle size distribution as described in WO 2014/026298 A1 of Tofwerk AG.

Preferably, the method according to the invention is used in a method for detecting explosives in a sample comprising aerosol particles. In this case, the method for detecting explosives in a sample comprising aerosol particles comprises the steps of analysing the sample with the method according to the invention, and of examining whether the result obtained by the analysis with the method according to the invention provides indications of the presence of an explosive.

Other advantageous embodiments and combinations of features come out from the detailed description below and the totality of the claims.

BRIEF DESCRIPTION OF THE DRAWINGS

The drawings used to explain the embodiments show:

FIG. 1 a schematic view of an apparatus according to the invention for analysing a chemical composition of aerosol particles, which is as well used to illustrate the method according to the invention.

In the FIGURE, the same components are given the same reference symbols.

PREFERRED EMBODIMENTS

FIG. 1 shows a schematic view of an apparatus 1 according to the invention for analysing a chemical composition of aerosol particles. The method according to the invention for analysing a chemical composition of aerosol particles is explained in the context of the same FIGURE.

The apparatus 1 comprises an extractive electronspray ionisation source 2 and a mass analyser 3 in the form of a time of flight (TOF) mass analyser. The apparatus 1 further comprises a second ionisation source 5 in the form of a spark discharge ionisation source. This second ionisation source 5 is parallel connected to the EESI source 2. The mass analyser 3 is fluidly coupled to the EESI source 2 and to the second ionisation source 5 via an interface 4 in order to analyse ions produced by the EESI source 2 and ions produced by the second ionisation source 5.

The apparatus 1 comprises a switchable valve fluidly connected to the EESI source 2 and the second ionisation source 5, wherein the switchable valve is switchable between a first position, where the aerosol particles are passed to the EESI source 2 for ionisation, and a second position, where the aerosol particles are passed to the second ionisation source 5 for ionisation. This switchable valve may be the later described second valve 32. It may however be a different valve which is located downstream of the second valve 32.

The EESI source 2 comprises an electronspray generating charged droplets of liquid for dissolving the aerosol particles, wherein the liquid of the charged droplets of liquid is a solvent combined with water. Furthermore, the EESI source 2 comprises an evaporation unit for evaporating the liquid of the charged droplets of liquid while maintaining the components of the dissolved aerosol particles. In the present embodiment, the evaporation unit is a heating unit comprising a heated vaporisation region in the form of a heated capillary or ion guide in which the charged droplets of liquid can be directed for evaporating the liquid of the charged droplets such that the components of the dissolved aerosol particles remain.

The mass analyser 3 is configured to provide a mass spectrum of the ions when the ions are analysed.

When employing the method according to the invention, the aerosols are passed to the EESI source 2 for extracting components, in particular organic compounds, from the aerosol particles with an EESI source 2 and ionising the components with the EESI source 2 to ions. Furthermore, the ions are transferred to the mass analyser 3 and analysed with the mass analyser 3. The method according to the invention can be used in a method for detecting explosives in a sample comprising aerosol particles. In this case, the method for detecting explosives in a sample comprising aerosol particles comprises the steps of analysing the sample with the method according to the invention, and of examining whether the result obtained by the analysis with the method according to the invention provides indications of the presence of an explosive.

The apparatus 1 comprises an inlet 6 for passing a gaseous suspension of the aerosol particles from an outside of the apparatus 1 into the apparatus for analysing the chemical composition of the aerosol particles. In the present embodiment, the inlet 6 is an inlet for ambient air, thus an inlet for passing ambient air comprising the aerosol particles from the outside of the apparatus 1 into the apparatus 1 for analysing the chemical composition of the aerosol particles. We also call the ambient air with the aerosol particles sample gas.

Furthermore, the apparatus 1 comprises a denuder line 11 which fluidly couples the inlet 6 to the EESI source 2, the denuder line 11 comprising a denuder 21 for separating the aerosol particles from the gas phase of the gaseous suspension when passing from the inlet 6 to the EESI source 2.

The ambient air is scrubbed from gaseous trace gases by passing a denuder 21, which greatly reduces the background otherwise caused by such gaseous contaminants. From there the aerosol particles continue into the EESI source 2 where the organic compounds of the aerosol particles are extracted into the liquid phase by directing an electrospray into the air flow. Afterwards the droplets evaporate during transit through a heated capillary or ion guide. The solvent is thereby rapidly removed while the droplets' charge remains in the droplets. The droplets eventually explode into smaller droplets by Coulomb explosion mechanism and in the end charging the organic molecules of interest. The ions proceed through the interface 4 which is differentially pumped into the mass analyser 3. The mass analyser 3 can also be an ion mobility analyser coupled to a mass analyser. Note that the interface 4 can also include ion optics for parent ion selection and fragmentation. An ion detector within the mass analyser will generate electric signals, which are recorded by data acquisition electronics (not shown) which digitize the data and send it to a computer (not shown).

The apparatus 1 further comprises a filter line 12 which fluidly couples the outside of the apparatus 1 with the EESI source 2, the filter line 12 comprising a filter 22 for filtering the aerosol particles out of the gaseous suspension and thus separating the gas phase from the aerosol particles when passing from the outside of the apparatus 1 to the EESI source 2. More precisely, the filter line 12 fluidly connects the inlet 6 with the EESI source 2. Thus, obtaining mass spectra of the gas without any aerosol particles is enabled. Therefore, the identification of the different substances in the mass spectra is simplified because due to the filter line 12 with the filter 22 and the parallel switched denuder line 11 with the denuder 21, mass spectra from ions of either the gas or the aerosol particles can be obtained while yet, over the mass spectra obtained from the ions of the aerosol particles and the mass spectra obtained from the ions of the gas, the total information of the substances in the sample can be gathered. This advantage is particularly present in case substances in the aerosol particles and substances in the gas shall be analysed and in case the sample comprises a large number of different substances because the number of substances providing signal in one mass spectrum can be reduced as it is possible to provide either only aerosol particles or only gas to the EESI source 2 and thus provide either only ions originating from the aerosol particles or only ions originating from the gas to the mass analyser 3. This reduction of the number of substances providing signal in one mass spectrum is particular advantageous in cases where a large variety of substances should be detected in the sample. This is for example the case if the apparatus 1 is used for detecting explosives since some components of explosives are predominantly present in the gaseous phase while other are predominantly present in the form of aerosol particles or in condensed form on some other aerosol particles. Thus, when using the method according to the invention for detecting explosives in a sample comprising explosives, it is an advantageous embodiment to employ the denuder line 11 and the filter line 12, wherein the denuder line 11 enables the aerosol particles to bypass the filter 22, while the filter line 12 enables the gas phase of the gaseous suspension to bypass the denuder 21. Furthermore, the apparatus comprises a valve 31 in the denuder line 11 upstream of the denuder 21 which can be switched to allow the sample gas to take the filter line 12 into the filter 22 which removes the aerosol particle. This will result in particle free air which is then again passed through the denuder 21 and the EESI source 2. This allows rapid determination of a background spectrum which can be subtracted from the particle spectrum, further reducing the detection limit of the method and the apparatus 1.

The apparatus 1 comprises a clean gas line 13 for fluidly coupling a clean gas source via the denuder 21 with the EESI source 2. The clean gas is preferably a pure gas with no hydrocarbon contamination. For example, the clean gas is Argon or Nitrogen. This allows for easily assessing the background and cleanliness of the system and allows identifying problems fast. Furthermore, the apparatus 1 comprises a test gas line 14 for fluidly coupling a test gas source via the denuder 21 with the EESI source 2. The test gas is preferably pure nitrogen with 10 ppm of benzene, toluene and xylene each, which is sometimes called BTX. In a variant, the test gas may however be a different gas. Using BTX as test gas however allows routine assessment of the denuder gas phase removal efficiency since it contains a high concentration of organic gas contaminants. If the gas phase removal efficiency is not >99% the denuder should preferably be regenerated.

Both the clean gas line 13 and the test gas line 14 are fluidly coupled via valve 31 with the denuder line 11 and the denuder 21. It is to be mentioned here that valve 31 symbolizes a valve or a combination of valves which allow only one line of the incoming lines denuder line 11, filter line 12, clean gas line 13 and test gas line 14 to be connected to the denuder 21 at any time.

The apparatus 1 additionally comprises a second valve 32 in the denuder line 11 downstream of the denuder 21 which can be switched to allow the sample gas or aerosol particles coming from the denuder 21 to reach the EESI source 2 or to allow gas from another gas line to reach the EESI source 2 without having passed the denuder 2. In the present embodiment, both, a branch of the clean gas line 13 and a branch of the test gas line 14 are fluidly connected with the second valve 32. Thus, clean gas and test gas can be passed to the EESI source 2 while bypassing the denuder 21. Passing clean gas to the EESI source 2 while bypassing the denuder 21 for example enables to check the cleanliness of the system in the gas mode and verify the primary spray fluid in the EESI source 2 is not contaminated.

Furthermore, the apparatus 1 comprises a bypass line 15 for bypassing the denuder 21 in the denuder line 11. This bypass line 15 is fluidly connected with the denuder line 11 upstream of the denuder 21 and fluidly connected with the second valve 32. Thus, sample gas with aerosol particles can be passed to the EESI source 2 while bypassing the denuder 21 and the filter 22. This bypass line 15 can also be called an air line for fluidly connecting an air source with the extractive electronspray ionisation source. Thus the apparatus 1 can be operated in a gas sampling mode and a particle sampling mode by switching the second valve 32.

The apparatus 1 additionally comprises a calibration gas line 16 for fluidly connecting a calibration gas source with the EESI source 2. This calibration gas line 16 is fluidly connected to the second valve 32 which is switchable between a mode where the calibration gas is directed to the EESI source 2 and a mode where no calibration gas is directed to the EESI source 2. The calibration gas is preferably nitrogen containing a known amount of the gas one plans to measure. It may however as well be pure nitrogen with accurately known amount of benzene, toluene and xylene, which is sometimes called BTX. The amounts of benzene, toluene and xylene may however differ from the amounts possible used as test gas. In case the calibration gas comprises known amounts of organic traces, a calibration of the measurements in the gas mode when air is allowed through the bypass line 15, and also to some degree in the particle mode when the air sample with aerosol particles is allowed through the denuder line 11 and the denuder 21.

It is to be mentioned here that the second valve 32 symbolizes a valve or a combination of valves which allow only one line of the incoming clean gas line 13, calibration gas line 16, bypass line 15 and denuder line 11 with denuder 21 to be connected to the EESI source 2 at any time.

Both the valve 31 and the second valve 32 should be designed in a way that prevents the loss of aerosol particles during wall collisions. This is preferably done by maintaining a laminar gas flow which is part of the knowhow of experts in the field of aerosol measurement.

The second valve 32 needs to be designed in a way that prevents the condensation of organic gases on walls. This is done by using the appropriate materials for the lines and the valve 32, and by maintaining a laminar gas flow which all is part of the knowhow of experts in the field of aerosol measurement. In a variant, it is as well possible to heat the lines and the second valve 32 in order to prevent condensation of organic gases on walls.

The apparatus 1 comprises a second calibration gas line 17 for fluidly connecting a second calibration gas source with the second ionisation source 5. The second calibration gas preferably comprises metal nano particles. In the embodiment shown in FIG. 1, the second calibration gas line 17 comprises a third valve 33 which enables to control the flow of the second calibration gas to the second ionisation source 5. The function of this third valve 33 may however be integrated in the second valve 32. In this case, the second calibration gas line 17 would be connected to the second valve 32.

In the present embodiment, where the second calibration gas line 17 is fluidly connected via the third valve 33 to the second ionization source 5, the apparatus 1 further comprises a second bypass line 18 connecting the inlet 6 directly with the third valve 33. By this second bypass line 18, sample gas with aerosol particles can be passed directly to the second ionisation source 5. The third valve 33 enables to control the direct flow of sample gas with aerosol particles to the second ionisation source 5.

The apparatus 1 comprises an electronic data acquisition system 41 for processing the signals provided by the mass analyser 3. This electronic data acquisition system 41 comprises at least one analog-to-digital converter (ADC) producing digitized data from the signals obtained from the mass analyser 3 and a fast processing unit receiving the digitized data from said analog-to-digital converter, wherein the fast processing unit is programmed to continuously, in real time inspect the digitized data for events of interest measured by the mass analyser, and wherein the electronic data acquisition system 41 is programmed to forward the digitized data representing mass spectra relating to events of interest for further analysis and to reject the digitized data representing mass spectra not relating to events of interest. This mode is called "event trigger mode" and is described in WO 2016/004542 A1 of Tofwerk AG.

Furthermore, the apparatus 1 comprises a control unit 42 for triggering the mass analyser 3 whenever an individual aerosol particle reaches the extractive electrospray ionisation source 2, triggering the mass analyser 3 for analysing the ions originating from the individual aerosol particle. Thus, the apparatus 1 is a single particle aerosol mass spectrometer.

The invention is not limited to the embodiment described above. For example, the apparatus is not required to be a single particle aerosol mass spectrometer. For example, the apparatus may comprise an ion mobility spectrometer which is arranged between the extractive electronspray ionisation source and the mass analyser and fluidly coupled to the extractive electronspray ionisation source and the mass analyser. In the embodiment shown in FIG. 1, the interface 4 may for example comprise the ion mobility spectrometer or even be formed by the ion mobility spectrometer.

For example the invention may be employed without one or more of the calibration gas line, the second calibration gas line, the bypass line, the second bypass line, the test gas line, the clean gas line, the filter line with the filter, the denuder line with the denuder, the valve 31 and the second valve 32 and the third valve 33. Furthermore, the invention may be employed without the second ionisation source.

In summary, it is to be noted that an apparatus and a method for analysing a chemical composition of aerosol particles are provided that allow for a flexible use for analysing the chemical composition of aerosol particles.

The invention claimed is:

1. Apparatus for analysing a chemical composition of aerosol particles, the apparatus comprising:
   a) an extractive electrospray ionisation source for extracting components, from the aerosol particles and for ionising the components to ions,
   b) a mass analyser for analysing the ions, the mass analyser fluidly coupled to the extractive electrospray ionisation source,
   c) an inlet for passing a gaseous suspension of the aerosol particles from an outside of the apparatus into the apparatus for analysing the chemical composition of the aerosol particles, the inlet being fluidly coupled to the extractive electrospray ionisation source,
   d) a denuder line which fluidly couples the inlet to the extractive electrospray ionisation source, the denuder line comprising a denuder for separating the aerosol particles from the gas phase of the gaseous suspension when passing from the inlet to the extractive electrospray ionisation source, and
   e) a filter line which fluidly couples the outside of the apparatus with the extractive electrospray ionisation source, the filter line comprising a filter for filtering the aerosol particles out of the gaseous suspension and thus separating the gas phase from the aerosol particles when passing from the outside of the apparatus to the extractive electrospray ionisation source,
   wherein the denuder line enables the aerosol particles to bypass the filter, while the filter line enables the gas phase of the gaseous suspension to bypass the denuder.

2. Apparatus according to claim 1, wherein the mass analyser is configured to provide a mass spectrum of the ions when the ions are analysed.

3. Apparatus according to claim 1, wherein the apparatus further comprises an electronic data acquisition system for processing signals provided by the mass analyser, whereas the electronic data acquisition system comprises
   a) at least one analog-to-digital converter producing digitized data from the signals obtained from the mass analyser;
   b) a processing unit receiving the digitized data from said analog-to-digital converter;
   wherein
   c) the processing unit is programmed to continuously, in real time inspect the digitized data for events of interest measured by the mass analyser; and
   d) the electronic data acquisition system is programmed to forward the digitized data representing mass spectra relating to events of interest for further analysis and to reject the digitized data representing mass spectra not relating to events of interest.

4. Apparatus according to claim 1, wherein the apparatus comprises an ion mobility spectrometer which is arranged between the extractive electrospray ionisation source and the mass analyser and fluidly coupled to the extractive electrospray ionisation source and the mass analyser.

5. Apparatus according to claim 1, wherein the apparatus comprises a clean gas line for fluidly coupling a clean gas source via the denuder with the extractive electrospray ionisation source.

6. Apparatus according to claim 1, wherein the apparatus comprises a test gas line for fluidly coupling a test gas source via the denuder with the extractive electrospray ionisation source.

7. Apparatus according to claim 1, wherein the apparatus comprises an air line for fluidly connecting an air source with the extractive electrospray ionisation source.

8. Apparatus according to claim 1, wherein the apparatus comprises a calibration gas line for fluidly connecting a calibration gas source with the extractive electrospray ionisation source.

9. Apparatus according to claim 1, wherein the apparatus comprises a second ionisation source wherein the second ionisation source is parallel connected to the extractive electrospray ionisation source.

10. Apparatus according to claim 1, wherein the apparatus is an apparatus for determining an aerosol particle size distribution and comprises an aerosol particle gate and a drifting region, wherein the drifting region is fluidly coupled to the aerosol particle gate and the aerosol particle gate is configured to insert batches of aerosol particles or individual aerosol particles into the drifting region for passing the aerosol particles through the drifting region, wherein the mass analyser is fluidly coupled to the drifting region and configured to measure the drift time the aerosol particles require to pass through the drifting region.

11. Method for analysing a chemical composition of aerosol particles, with an apparatus for analysing a chemical composition of aerosol particles, the apparatus comprising:
   a) an extractive electrospray ionisation source for extracting components from the aerosol particles and for ionising the components to ions,
   b) a mass analyser for analysing the ions, the mass analyser fluidly coupled to the extractive electrospray ionisation source,
   c) an inlet for passing a gaseous suspension of the aerosol particles from an outside of the apparatus into the apparatus for analysing the chemical composition of the aerosol particles, the inlet being fluidly coupled to the extractive electrospray ionisation source,
   d) a denuder line which fluidly couples the inlet to the extractive electrospray ionisation source, the denuder line comprising a denuder for separating the aerosol particles from the gas phase of the gaseous suspension when passing from the inlet to the extractive electrospray ionisation source, and
   e) a filter line which fluidly couples the outside of the apparatus with the extractive electrospray ionisation source, the filter line comprising a filter for filtering the aerosol particles out of the gaseous suspension and thus separating the gas phase from the aerosol particles when passing from the outside of the apparatus to the extractive electrospray ionisation source,
   wherein the denuder line enables the aerosol particles to bypass the filter, while the filter line enables the gas phase of the gaseous suspension to bypass the denuder, the method including the steps of:
   a) passing a gaseous suspension of the aerosol particles from the outside of the apparatus through the inlet of the apparatus into the apparatus, separating the aerosol particles from the gas phase of the gaseous suspension with the denuder of the denuder line of the apparatus, and extracting components from the aerosol particles with the extractive electrospray ionisation source and ionising the components with the extractive electrospray ionisation source to ions,
   or
   passing the gaseous suspension of aerosol particles from the outside of the apparatus to the extractive electrospray ionisation source and filtering the aerosol particles out of the gaseous suspension and thus separating the gas phase from the aerosol particles with a filter of the filter line of the apparatus and ionising the gas with the extractive electrospray ionisation source,
   b) transferring the ions to the mass analyser of the apparatus and
   c) analysing the ions with the mass analyser and producing a mass spectrum of the ions.

12. Method for detecting explosives in a sample comprising aerosol particles, characterised in the steps of analysing the sample with the method according to claim 11, and of examining whether the mass spectrum obtained by the analysis with the method according to claim 11, provides indications of the presence of an explosive.

13. Apparatus according to claim 1, wherein the extractive electrospray ionisation source is for extracting components from the aerosol particles and for ionising the organic components to ions, the components being organic compounds.

14. Apparatus according to claim 1, wherein the mass analyser is a time of flight mass analyser.

15. Apparatus according to claim 9, wherein the second ionisation source is a spark discharge ionisation source.

16. Method according to claim 11, wherein when extracting components from the aerosol particles with the extractive electrospray ionisation source and ionising the components with the extractive electrospray ionisation source to ions, organic compounds are extracted from the aerosol particles with the extractive electrospray ionisation source and ionised with the extractive electrospray ionisation source to ions.

17. Method according to claim 11, wherein the mass analyser of the apparatus is a time of flight mass analyser.

* * * * *